US012086054B1

(12) United States Patent
Cela Diaz et al.

(10) Patent No.: US 12,086,054 B1
(45) Date of Patent: Sep. 10, 2024

(54) MODEL VALIDATION AS A SERVICE

(71) Applicant: Wells Fargo Bank, N.A., San Francisco, CA (US)

(72) Inventors: Fernando Cela Diaz, Brooklyn, NY (US); Agus Sudjianto, Charlotte, NC (US); Harsh Singhal, San Francisco, CA (US); Ningzhou Zeng, Mason, OH (US); Kai Arne Krueger, Charlotte, NC (US); Harsh Vardhan Tiwari, Charlotte, NC (US); Ridhi Puppala, Hyderabad (IN); Karan H. Jeswani, Mumbai (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/048,287

(22) Filed: Oct. 20, 2022

Related U.S. Application Data

(63) Continuation of application No. 17/805,388, filed on Jun. 3, 2022.

(60) Provisional application No. 63/196,552, filed on Jun. 3, 2021.

(51) Int. Cl.
*G06F 11/36* (2006.01)

(52) U.S. Cl.
CPC ........ *G06F 11/368* (2013.01); *G06F 11/3608* (2013.01); *G06F 11/3664* (2013.01); *G06F 11/3684* (2013.01); *G06F 11/3688* (2013.01)

(58) Field of Classification Search
CPC ............... G06F 11/368; G06F 11/3608; G06F 11/3664; G06F 11/3684; G06F 11/3688
USPC .................................................. 717/124–135
See application file for complete search history.

(56) References Cited

U.S. PATENT DOCUMENTS

| | | | | |
|---|---|---|---|---|
| 7,231,327 | B1 | 6/2007 | Beverina et al. | |
| 8,417,715 | B1 * | 4/2013 | Bruckhaus ............. | G06Q 10/04 705/26.1 |
| 8,812,334 | B2 | 8/2014 | Givens et al. | |
| 10,719,301 | B1 | 7/2020 | Dasgupta et al. | |
| 2005/0256665 | A1 * | 11/2005 | Hartmann ........... | G06F 11/3684 702/121 |
| 2008/0082958 | A1 * | 4/2008 | Hartman ................... | G06F 8/73 717/104 |

(Continued)

OTHER PUBLICATIONS

Incki, Koray, Ismail Ari, and Hasan Sözer. “A survey of software testing in the cloud.” 2012 IEEE Sixth International Conference on Software Security and Reliability Companion. IEEE, 2012. (Year: 2012).*

(Continued)

*Primary Examiner* — Qing Chen
(74) *Attorney, Agent, or Firm* — Shumaker & Sieffert, P.A.

(57) ABSTRACT

This disclosure describes techniques that include validation or other assessments of digital systems, such as machine learning models and other statistical models. In one example, this disclosure describes a method that includes receiving, by a validation computing system and from a development system, a request to perform a test on a model configured to execute on the development system; outputting, by the validation computing system to the development system and in response to the request, an instruction; enabling the development system to process the instruction; receiving, by the validation computing system, test response data; evaluating, by the validation system, the test response data.

17 Claims, 9 Drawing Sheets

(56) References Cited

U.S. PATENT DOCUMENTS

| | | | | |
|---|---|---|---|---|
| 2010/0095276 | A1* | 4/2010 | Ottavi | G06F 11/3672 717/125 |
| 2011/0145653 | A1* | 6/2011 | Broadfoot | G06F 11/3604 714/E11.217 |
| 2011/0225568 | A1 | 9/2011 | Rajan et al. | |
| 2015/0234731 | A1* | 8/2015 | Williams | G06F 11/3684 717/124 |
| 2016/0364310 | A1* | 12/2016 | Maple | G06F 11/3688 |
| 2019/0303759 | A1 | 10/2019 | Farabet et al. | |
| 2020/0117580 | A1* | 4/2020 | Lekivetz | G06F 11/368 |
| 2020/0327047 | A1* | 10/2020 | Mayhew | G06F 11/3466 |
| 2021/0049054 | A1* | 2/2021 | Walters | G06N 3/06 |
| 2021/0286703 | A1 | 9/2021 | Cmielowski et al. | |
| 2022/0179639 | A1 | 6/2022 | Manley | |
| 2022/0245058 | A1* | 8/2022 | Sharnagat | G06F 11/3608 |

OTHER PUBLICATIONS

"Revit Plugin Validation", SkyCiv, Retrieved from: https://skyciv.com/docs/skyciv-api/plugins/revit-plugin-validation/, Oct. 19, 2020, 14 pp.

Gogolla et al., "Achieving Model Quality through Model Validation, Verification and Exploration", ScienceDirect, vol. 54, Dec. 3, 2018, pp. 1-52.

Pedersen et al., "thedersen/backbone validation", Retrieved from: https://github.com/thedersen/backbone.validation, Accessed on Apr. 13, 2021, Aug. 5, 2015, 37 pp.

Sharma et al., "Certifai: Counterfactual Explanations for Robustness, Transparency, Interpretability, and Fairness of Artificial Intelligence models", Cornell University, May 20, 2019, 8 pp.

U.S. Appl. No. 17/805,388, filed Jun. 3, 2022, naming inventors Cela Diaz et al.

Gery et al., "Rhapsody: A Complete Life-Cycle Model-Based Development System", Springer-Verlag Berlin Heidelberg, Jan. 1, 2002, 10 pp., URL: https://link.springer.com/chapter/10.1007/3-540-47884-1_1.

Office Action from U.S. Appl. No. 17/805,388 dated Oct. 6, 2023, 34 pp.

Response to Office Action dated Oct. 6, 2023 from U.S. Appl. No. 17/805,388, filed Jan. 8, 2024, 14 pp.

Notice of Allowance from U.S. Appl. No. 17/805,388 dated May 13, 2024, 16 pp.

* cited by examiner

310

```
311 class BotModelWrapper(TextClassificationModel):

312 def __init__(self) -> Dataset:
       self.model = WFBot()

313 def get_training_dataset(self) -> Dataset:
       data = pd.read_csv("/models/train_data.csv")
       data_dict = DataDictionany.from_json_file("/models/bot/train_data_info.json")
       return Dataset(data=data, data_dict=data_dict=data_dict)

314 def get_model_information(self) -> Modellnfo:
       return Modellnfo.from_json_file("/models/bot/train_data_info.json")

315 def predict(self, data : Dataset) -> np.ndarray:
       return self.model.predict(data.as_pandas())

    def predict_proba(self, input) -> np.ndarray:
       return self.model.predict()
```

```
class BotModelWrapper(TextClassificationModel):
    def __init__(self) -> Dataset:
        self.model = WFBot()

    def get_model_info(self) -> ModelInfo:
        return ModelInfo.from_json_file("/models/bot/train_data_info.json")

    def get_training_dataset(self) -> Dataset:
        data = pd.read_csv("/models/train_data.csv")
        metadata = Metadata.from_json_file("/models/bot/train_data_info.json")
        return Dataset.from_pandas(df=data, metadata=metadata)

    def predict(self, data : Dataset) -> Dataset:
        data = self.model.predict(data.to_pandas())
        return Dataset.from_numpy(data, metadata=self.predict_meta)

    def predict_proba(self, input) -> Dataset:
        data = self.model.predict_proba(data.to_pandas())
        return Dataset.from_numpy(data, metadata=self.predict_proba_meta)

    def retrain(self, data: Dataset) -> BotModelWrapper:

self.model.fit(X=data.get_predictors().to_pandas(),y=data.get_target().to_pandas())
        return self
```

```
# Implements a data schema based on Frictionless Data Table Schema
# see: https://specs.frictionlessdata.io/table-schema/
fields :
   -name: sepal_length
    type: number
    title: "Sepal Length"
    description: "Lenght of the Sepal (each of the parts of the calyx of a flower,
enclosing the petals and typically green and leaflike)"
    constraints:
      required: true
      minimum: 0
      maximum: 10
   -name: sepal_width
    type: number
    title: "Sepal Width-
    description: "Width of the Sepal (each of the parts of the calyx of a flower,
enclosing the petals and typically green and leaflike)"
    constraints:
      required: true
      minimum: 0
      maximum: 10
   -name: petal_length
    type: number
    title: "Petal Length"
    constraints:
      required: true
      minimum: 0
      maximum: 10
   -name: petal_width
    type: number
    title: "Petal Width"
    constraints:
      required: true
      minimum: 0
      maximum: 10
   -name: species
    type: string constraints:
      required: true
      enum: ["setosa", "versicolor", "virginica"]
   -name: weight
    type: number
    constraints:
      required: false
      minimum: 0
   -name: observation_id
    type: integer
    constraints:
      required: true
      unique: true
      minimum: 0
   -name: observation_group_id
    type: integer
    constraints:
      required: false
      unique: false
      minimum: 0
   -name: collector_ssn
    type: string
    constraints:
      required: false
   -name: collector_gender
    type: string
    constraints:
      enum: ["male", "female", "undisclosed"]
      required: true
config:
   -target: ["species"]
   -
  id: ["observation_id", "observation_group_id", "collec tor_ssn"]
   -weight: "weight"
   -protected: ["collector_gender"]
   -semantic_constraints:
      -sepal_len_gt_wdt: "sepal_lenght > sepal_width"
      -petal_len_gt_wdt: "petal_lenght > petal_width"
```

```
enum SMMPResponseConstraint {
        MONOTONICALLY_INCREASE = 0;
        MONOTONICALLY_DECREASE = 1;
        CONVEX                 = 2;
        CONCAVE                = 3;
}
message SMMPConstraint1DList {
        repeated SMMPResponseConstraint constraints = 1;
}
message SMMPVarDependency {
        string variable    = 1;
        string depends_on  = 2;
}
message SMMPListOfVars {
        repeated string variables = 1;
}
message SMMPListOfNames {
        repeated string values = 1;
}
message SMMPDatasetMetadata {
        // names of the field that contain ...           // --------------------------------------------------------------------------
        repeated string id                               = 1;  // observation id, an unique identifier of an individual for panel data
        string weights                                   = 2;  // observation weight
        repeated string time                             = 3;  // time, a field that defines the observation time for panel data
        repeated string target                           = 4;  // target variable(s) we are trying to predict
        repeated string predictors                       = 5;  // list with all the variables that go in the model frame passed to the model
        repeated string unused_predictors                = 6;  // names of all the variables in the model frame that are known to be unused
        repeated string protected_predictors             = 7;  // names of protected variable(s), i.e. variables that can't be used in modeling
        map<string, SMMPConstraint1DList> constraints1d   = 8;  // contraints on reponse
        map<string, SMMPListOfVars>  predictor_groups     = 9;  // variable names of group variables
        repeated string predictions                      = 10; // if multiple predictions are made, their names (e.g. PD, EAD, LGD, EL)
        repeated string main_prediction                  = 11; // name of the main prediction (or predictions) (e.g. EL)
        map<string, SMMPListOfVars> predictions_proba     = 12; // name of columns defining probability distribution of predictions
        repeated string data_invariants                  = 13; // list of validation rules for the whole dataset, expressed as SQL filters
        repeated string continuous_vars                  = 14; // variable names of the numeric fields
        repeated string categorical_vars                 = 15; // variable names of the categorical fields to treat differently
        map<string, SMMPListOfNames> categorical_vars_levels  = 16; // levels of each categorical variable
        repeated string ordered_vars                     = 17; // variables to be treated as ordered categoricals
        repeated string timestamp_vars                   = 18; // variable names of variables that should be treated as dates
        repeated SMMPVarDependency dependencies          = 19; // graph of variable dependencies
        map<string, int32> predictors_effect             = 20; // effect of an increase(decrease) in the output caused for an increase(decrease) in the input,
                                                               //+1 = increase, -1 = decrease, 0 = unknown/undefined
        string extra                                     = 100;// any arbitrary string
}
```

```
class TextAttack(TextAttackValidation):
    "" "" ""
   Attack the model using DSAI serialized adversarial text generation
method,, measuring the model robustness. Compare the model performance on
the original records vs the altered record ...
    "" "" ""
def validate(self, model: TextClassificationModel,word_ratio: float = 1.0,
word_count: int = 5, adversarial_word_perturb : bool = True
> TextAttackValidationResults:
        """Validation method for a text attack model

       Parameters
       ----------
       model  : TextClassificationModel
           A model implementing all the traits exp
       word_ratio : float, defaults to 1.0 ...
       ...
       """
#Interrogate the model iteratively
#and do whatever needed

#Report the minimum
results = TextAttackValidationResults()
#use the methods in the TextAttackValidationResults object to report results
#required by a Text Attack validation type


return results
```

FIG. 3E

MODEL VALIDATION AS A SERVICE

CROSS REFERENCE

This application is a continuation application of and claims priority to U.S. patent application Ser. No. 17/805,388 filed on Jun. 3, 2022, which claims the benefit of U.S. Provisional Patent Application No. 63/196,552 filed on Jun. 3, 2021. The entire content of both applications is hereby incorporated by reference.

TECHNICAL FIELD

This disclosure relates to evaluating models, including machine learning and/or statistical models.

BACKGROUND

Modern businesses rely heavily on digital systems, including models trained using machine learning techniques and other statistical techniques. To trust such models, businesses must have confidence in the decisions they make. Often, models have hidden decision processing layers, creating challenges when auditing, explaining, or otherwise scrutinizing the decisions made by models. However, such scrutiny is important, since businesses are accountable for decisions made by their models. Preferably, decisions made by models are fair, free of algorithmic or other bias, explainable, robust, and compliant with applicable regulations.

SUMMARY

This disclosure describes techniques that include validation or other assessments of digital systems, such as machine learning models and other statistical models. In some examples, such techniques may involve validating models by providing a service that defines model tests and executes them at scale, in a way that maximizes test discovery, reuse, and interoperability. Validation services, as described herein, may be provided in an "on demand" manner, enabling a range of related or unrelated groups, organizations, and entities to obtain validation assurances for models being developed, tested, or evaluated. Described herein is an infrastructure that enables "validators" (i.e., individuals or systems performing such validations) to define suites of tests that model developers can execute as they choose, at any point during the model development process or thereafter.

As described herein, model developers may configure their models to take advantage of on-demand validation services. In some examples, a model validation service may distribute a software toolkit, sample code, plug-in modules, and/or other functionality to model developers. Model developers use these tools when developing a model, thereby enabling the model to expose functionality of the model to a remote validation service. Once a model is configured to enable interaction with the validation service, the validation service may test and/or validate the model. In some examples, the validation service may use a set of standardized test scripts to test models in a consistent and uniform way. Such standardized test scripts may be applicable across many types of models, or in some cases, such standardized test scripts might be applicable to only a narrow set of models.

Validation may be performed across many models concurrently. In some examples, validation services may be performed across multiple organizations, including across multiple diverse and independent entities. In other examples, validation services may be performed concurrently across related organizations or lines of business within a single organization.

The techniques described herein may provide certain technical advantages. For instance, by providing model validation services that can be used in a relatively convenient and non-intrusive manner, model developers may obtain early feedback about critical weaknesses of their models, logical or other sensitivities that may affect model operation or viability, potential issues relating to input or training data, fairness, model instability, and other issues. Model developers may test more, and test more often, thereby providing efficiency and reliability benefits. Such benefits might parallel those resulting from effective use of unit testing for traditional programming projects (i.e., "unit tests for models").

Further, by providing a platform that enables test discovery, reuse, and interoperability, model validators will tend to more frequently reuse existing tests and automate test execution, while avoiding learning curves that might otherwise accompany traditional model validation techniques. Accordingly, model validation processes will tend to be more productive, efficient, and effective. Techniques described herein may also simplify the task of interpreting validation results and other data by standardizing the outputs of entire families of tests.

In some examples, this disclosure describes operations performed by a computing system in accordance with one or more aspects of this disclosure. In one specific example, this disclosure describes a method comprising receiving, by a validation computing system and from a development system, a request to perform a test on a model configured to execute on the development system; outputting, by the validation computing system to the development system and in response to the request, an instruction; enabling the development system to process the instruction; receiving, by the validation computing system and from the development system, test response data; evaluating, by the validation system, the test response data.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 3A is an example source code listing illustrating code that a model developer might use to enable an existing model to be validated remotely, in accordance with one or more aspects of the present disclosure.

FIG. 3B is an alternative example source code listing illustrating code that a model developer might use to enable an existing model to be validated remotely, in accordance with one or more aspects of the present disclosure.

FIG. 3C illustrates an example dictionary data structure listing syntactic and semantic information about data that might be used for an example model, in accordance with one or more aspects of the present disclosure.

FIG. 3D illustrates an alternative metadata specification listing syntactic and semantic information about data that might be used in an example model, in accordance with one or more aspects of the present disclosure.

FIG. 3E illustrates an example validation test code listing, in accordance with one or more aspects of the present disclosure

DETAILED DESCRIPTION

Figure 1A:
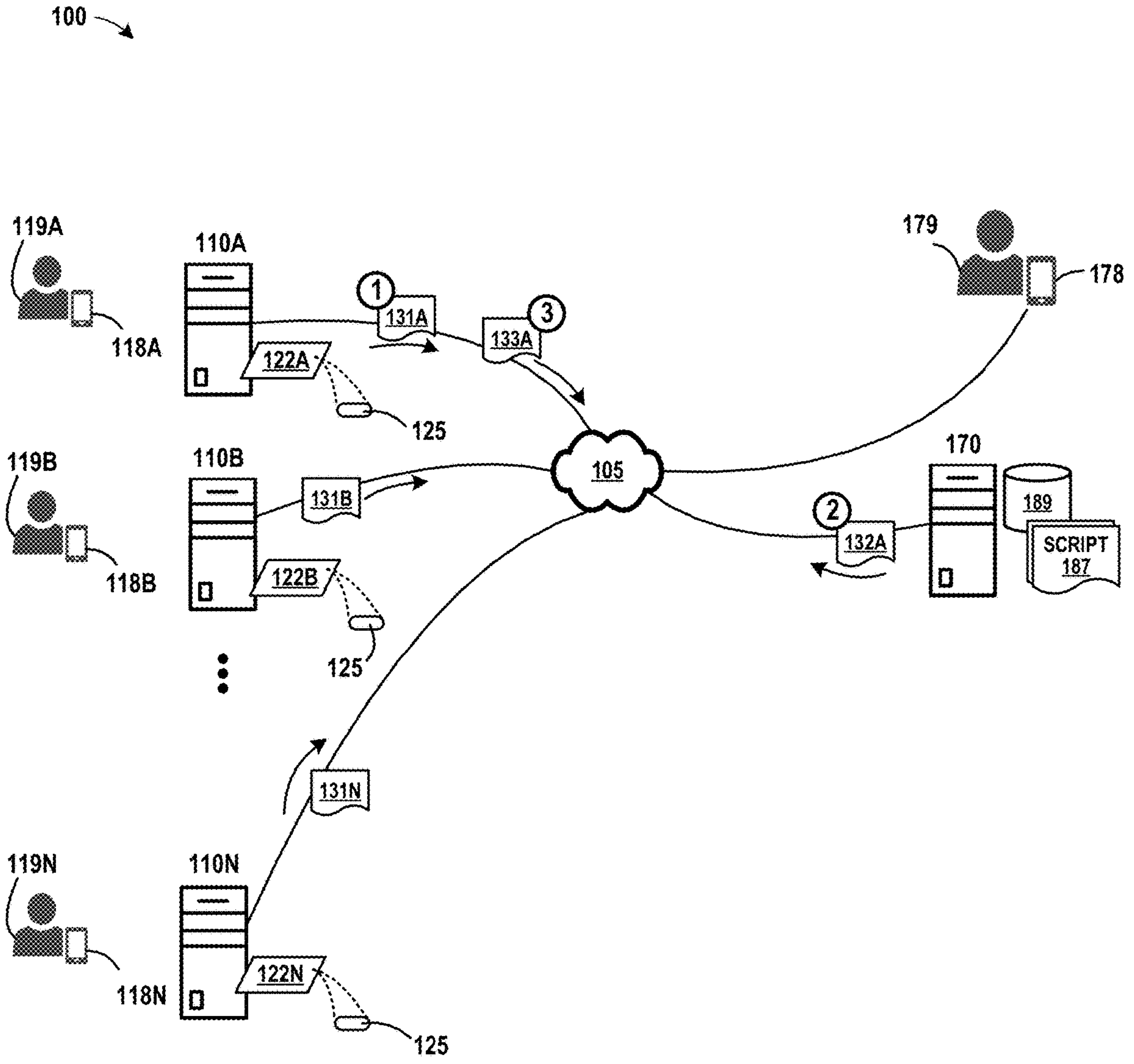
FIG. 1A is a conceptual diagram illustrating a system in which validation services are provided to each of a number of other computing systems, in accordance with one or more aspects of the present disclosure.

Model development challenges have increased as the number, breadth, and depth of models has grown. For example, with more models, there is an increased need for higher-volume, faster, more extensive, and more efficient review and validation of models. Decisions made by models often drive operations performed by businesses and other organizations, so it is important to assess their decision-making processes. Models that operate in a way that poses risks to a business or organization should be identified early and addressed. Accordingly, a "model risk" platform is sometimes used to evaluate and validate models before they are placed in production, or, in some cases, to monitor operation of models that might already be in production.

Traditionally, validation of a model is performed by an analyst (i.e., a "validator"), which is a person that is usually different than developer(s) of the model. Yet models, particularly those still under development, tend to work primarily in the platform in which they are developed. Accordingly, typical model validation practices involve a relatively inefficient process of transferring the model code to a model validator. The model validator then learns the code, rebuilds it in a validation platform or "model risk" platform, codes a suite of tests for the model, and then runs the tests and analyzes the results. This process often demands significant time and resources. For example, a chatbot model may have many gigabytes of dependencies that a validator would normally learn and implement on a validation platform (sometimes with tooling and languages that are unfamiliar to the validator). Also, toolkits used for developing and/or evaluating various types of models often differ and conflict, thereby further complicating the validation process.

Techniques described herein may improve the efficiency of the traditional validation process. For example, as described herein, a model validator may define a suite of model validation tests that can be remotely executed by a model developer at times chosen by the model developer, and at any point during or after model development. The suite of tests may include a collection of tests from a repository of tests, and/or may include newly-written tests (e.g., tests written specifically for a specific type of model). Newly-written tests may be coded by a validator on the validation platform.

Once a suite of validation tests is defined by a validator, the model developer may execute such tests on an on-demand basis, using the validation platform. Such tests may be executed often with little or no additional involvement of the human validator. In at least some examples described herein, test execution is remote: the model runs on the model developer's platform, while the test executes on the validation platform.

In some examples, model developers are provided with a software development kit ("SDK") that enables models under development to interact with a remove validation service. The SDK may be structured to enable model developers to wrap their models using a "validation probe," which may be software that enables the model to communicate with the remotely-located validation platform. Notably, such wrapping of models under development generally occurs on the model developer's platform, rather than on the validation platform. The probe enables the developer to describe the model, inputs, outputs, hyperparameters, runtime operations, and other attributes in a way that the validation platform can understand. Data abstractions allow model developers to specify the data consumed and produced by their models without having to introduce changes to conform to a specific interface. Generally, model developers describe their data rather than having to transform their data to a pre-specified format. Model validators may extract the data from the dataset in the format that is most convenient for their analysis.

FIG. 1A is a conceptual diagram illustrating a system in which validation services are provided to each of a number of other computing systems, in accordance with one or more aspects of the present disclosure. System 100 of FIG. 1A includes model development computing systems 110A through 110N (collectively, "model development computing systems 110"), each of which is in communication with validation computing system 170 over network 105. Network 105 may be any available and/or appropriate public or private network, and may, for example, be the internet. Each of model development computing systems 110 may be operated by one or more developers 119, either directly or through one or more developer devices 118. For example, developer 119A may operate model development computing system 110A directly or through developer device 118A (e.g., over network 105). Similarly, developer 119B may operate model development computing system 110B directly or through developer device 118B, and in general, developer 119N may operate model development computing system 110N directly or through developer device 118N.

As described herein, validation computing system 170 is configured to provide model validation services to one or more of model development computing systems 110. Validation computing system 170 may be operated by one or more validators 179, either directly or through one or more validator devices 178 (e.g., where each of validator devices 178 communicates with validation computing system 170 over network 105).

In FIG. 1A, each of model development computing systems 110 may be operated by, controlled by, or associated with an organization or line of business within a larger organization, such as a bank or other entity. In such an example, validation computing system 170 may be operated by or controlled by that same organization. In other examples, each of model development computing systems 110 may be operated by, controlled by, or associated with different, independent entities. In such an example, validation computing system 170 may also be operated by an independent entity, and operated as an independent, separate service.

For ease of illustration, only a limited number of computing devices (e.g., model development computing systems 110 and validation computing system 170) are shown in FIG. 1A and in other illustrations herein. Also, although each of model development computing systems 110 are shown as a single device, each of model development computing systems 110 is intended to represent any appropriate computing system or collection of computing systems, such as a distributed computing system, a cloud-based computing system, a data center, or any other appropriate arrangement. Similarly, although validation computing system 170 is illustrated as a single device, validation computing system 170 is intended to represent any appropriate computing system or collection of computing systems, such as a distributed computing system, a cloud-based computing system, a data center, or any other appropriate arrangement. Also, although developer devices 118 and validator device 178 are each shown as single devices, multiple computing devices may be used by developers 119 and validator 179.

Model development computing system 110A may develop model 122A in response to development activity of developer 119A. For example, developer 119A may interact directly with model development computing system 110A, or may interact with model development computing system 110A through developer device 118A. Based on such interactions, model development computing system 110A may generate model 122A. Interactions of developer 119A may correspond to a number of development activities, which may include writing programming code, selecting machine learning algorithms to use for model 122A, configuring such algorithms, training machine learning algorithms to perform and make predictions appropriately, and testing and retraining model 122A. Similarly, model development computing system 110B may develop one or more models 122B in response to development activity of developer 119B, and in general, model development computing system 110N may develop one or more models 122N.

Some aspects of a validation process for each of models 122 may be performed by the model development computing system 110 responsible for developing the model, and such validation might take place during or after development. As described herein, however, further validation of models 122 may be performed by validation computing system 170. Such further validation may test specific and/or general aspects of the model, and may be performed to ensure relatively uniform compliance with validation requirements across multiple models (e.g., across each of models 122 developed by model development computing systems 110). Evaluations and/or validations performed by validation computing system 170 may pertain to possible model weaknesses, sensitivities, fairness, instabilities, or other issues, and/or may pertain to issues relating to data used as input, output, and/or training data. Such validation may be performed by validation computing system 170 remotely, through interactions by validation computing system 170 with each of models 122 while those models execute on respective model development computing systems 110.

To perform such interactions, each of models 122 may incorporate functionality of testing module 125. Specifically, testing module 125 may represent software that is added to or integrated within each of models 122A through 122N. Testing module 125 may be designed to allow each of models 122 to communicate with validation computing system 170, and thereby enable validation computing system 170 to perform validation services on each of models 122. Testing module 125 may be distributed to or otherwise made available to each of developers 119 by an entity that controls or operates validation computing system 170. Such an entity may distribute testing module 125 along with instructions about how to integrate testing module 125 within each model 122 being developed at model development computing systems 110. As further described herein, each of developers 119 may integrate testing module 125 within respective models 122, making model adjustments or configuration adjustments to testing module 125 to enable testing module 125 to work within each specific model 122. Once testing module 125 is configured to work within a given model, that model may use testing module 125 to request model validation services on demand from validation computing system 170. As described herein, validation computing system 170 may provide validation services for a given model in response to such a request.

In accordance with one or more aspects of the present disclosure, each of model development computing systems 110 may develop one or more models 122. For instance, in an example that can be described with reference to FIG. 1A, model development computing system 110A develops, in response to activity of a model developer (e.g., developer 119A operating developer device 118A), one or more models 122A. Similarly, each of model development computing systems 110B through 110N may develop various models, typically at the direction of a respective developer 119.

Each of model development computing systems 110 may modify respective models 122 to include functionality of testing module 125. For instance, continuing with the example being described with reference to FIG. 1A, model development computing system 110A detects input that it determines corresponds to development activity. Such developer activity may be developer 119A making modifications to model 122A and/or configuring testing module 125 to work with model 122A. Based on such development activity, model development computing system 110A integrates testing module 125 within model 122A. In some examples, model 122A may be designed by developer 119A from the start to integrate functionality of testing module 125, thus requiring little or no modification of model 122A to include testing module 125. In general, each of models 122 developed at other model development computing systems 110 are also modified to include testing module 125 (e.g., developer 119B integrates testing module 125 within model 122B and developer 119N integrates testing module 125 within model 122N).

Each of models 122 may request validation services provided by validation computing system 170. For instance, again referring to the example being described with reference to FIG. 1A, model development computing system 110A outputs test request 131A over network 105 (see "1" illustrated in FIG. 1A). In some examples, test request 131A may be generated by testing module 125 within model 122A executing within a development platform on model development computing system 110A. Test request 131A may be automatically generated (and transmitted over network 105) during development, such as at specific development milestones, periodically, or on another schedule. In other examples, test request 131A may be generated in response to user input (e.g., developer 119A), in response to a schedule established by user input, in response operations performed by model 122A or testing module 125 included within model 122A, or in response to operations performed by other modules included within code executing on model development computing system 110A. Similarly, each of model development computing systems 110 may output respective test requests 131 over network 105 (e.g., model development computing system 110B may output test request 131B over network 105, and in general, model development computing system 110N may output test request 131N over network 105).

Validation computing system 170 may receive test requests 131 from each of model development computing systems 110. For instance, still referring to the example being described in the context of FIG. 1A, validation computing system 170 detects a signal over network 105 and determines that the signal corresponds to test request 131A from model development computing system 110A. Validation computing system 170 further determines that test request 131A corresponds to a request to validate model 122A. Similarly, validation computing system 170 detects each of test requests 131 (e.g., test requests 131B and 131N) over network 105 and determines that each test request 131 corresponds to a request, by a respective model development computing system 110, to validate one or more models 122.

Validation computing system 170 may access or generate a battery of validation tests for use in testing one or more models 122. For instance, again referring to FIG. 1A, validation computing system 170 accesses or generates one or more test scripts 187 (e.g., "pre-check scripts") that can be used to remotely interact with testing modules 125 and interrogate models that are integrated with or wrapped by testing module 125. Test scripts 187 may use a standard application programming interface ("API") to interrogate a given model, cause one or more models to execute with various inputs or parameters, and report results. Often, such test scripts 187 are developed or generated at validation computing system 170 in response to user input (e.g., validator 179 interacting directly with validation computing system 170 or through validator device 178). In some examples, test scripts 187 may consist of existing test scripts in which changes to parameters are sufficient to tailor such test scripts to specific models 122 (e.g., model 122A). In such an example, test scripts 187 may be accessed and/or generated without requiring additional code to be written. In other examples, validation computing system 170 may register a newly-written set of tests. Registration of tests may involve storing such tests in a repository of tests (e.g., data store 189). As previously discussed, in many instances test scripts 187 are accessed or generated by the validation computing system 170 on or in a platform that is different from the platform on or in which the specific models 122 are created (e.g., written in a different programming language, format, etc.). Such an arrangement provides an additional benefit of increased efficiency when different models 122 are created on or in different platforms. That is, in addition to being different from the platform of the test scripts 187, the model 122A may be developed in or on a different platform than model 122B (e.g., written in a different programming language, format, etc.).

Validation computing system 170 may interrogate one or more models. For instance, again with reference to the example being described in the context of FIG. 1A, validation computing system 170 evaluates test request 131A received from model development computing system 110A. Validation computing system 170 selects, based on test request 131A and information about model 122A, one or more test suites or one or more test scripts 187 to be executed for the purpose of validating model 122A. Validation computing system 170 outputs one or more test instructions 132A over network 105 (see "2" illustrated in FIG. 1A). Test instructions 132A may be based on the selected test suites and/or test scripts 187.

Model development computing system 110A may execute one or more test instructions 132A and report results to validation computing system 170. For instance, still with reference to FIG. 1A, model development computing system 110A receives test instructions 132A. Model development computing system 110A (or testing module 125 within model 122A) executes test instructions 132A, and generates information about the results of executing test instructions 132A. Model development computing system 110A (or testing module 125 executing within model 122A) uses the information about the results to generate test response 133A. Model development computing system 110A outputs test response 133A over network 105 to validation computing system 170 (see "3" illustrated in FIG. 1A).

Validation computing system 170 may analyze the results, and generate a validation diagnosis. For instance, again with reference to FIG. 1A, validation computing system 170 receives test response 133A. Validation computing system 170 evaluates test response 133A to assess model 122A. Validation computing system 170 determines a diagnosis pertaining to model 122A. Such a diagnosis may indicate that model 122A has been validated to some extent, or may indicate that model 122A cannot be validated. Validation computing system 170 stores the diagnosis, information about the diagnosis, a record of test response 133A, and/or other information about model 122A. In some examples, validation computing system 170 stores such information in data store 189.

Validation computing system 170 performs similar operations in response to each of test requests 131 received from respective model development computing systems 110. For instance, validation computing system 170 evaluates test request 131B received from model development computing system 110B, and selects one or more test scripts 187 to be executed to validate one or more models 122B. Validation computing system 170 outputs corresponding instructions (not specifically shown in FIG. 1A) to model development computing system 110B for execution by model 122*n*, and model development computing system 110B responds with information about the results of the tests. Similarly, and in general, validation computing system 170 evaluates test request 131N received from model development computing system 110N, selects one or more test scripts 187, and causes model 122N to execute the tests and report results back to validation computing system 170 (again, not specifically shown in FIG. 1A). Validation computing system 170 evaluates test results from each of model development computing systems 110B through model development computing system 110N, and assesses models 122B through 122N and performs a validation as to aspects of such models.

When assessing various models 122, validation computing system 170 may determine information about weaknesses of such models 122, sensitivities of models 122, potential issues in input data, potential fairness issues, model instabilities, or other information. In some examples, validation computing system 170 may determine that one or more of models 122 can be sufficiently validated based on test responses 133 received from respective model development computing systems 110. Those models 122 that are characterized as "validated" may proceed to formal validation, which may precede deployment of the model in production. Those models 122 that are not able to be validated by validation computing system 170 may be revised (e.g., at the appropriate model development computing system 110 in response to further development by a respective developer 119) and retested.

In general, system 100 of FIG. 1A may provide a systematic way of abstracting models and writing and organizing tests. In some cases, the validation services provided by validation computing system 170 might not replace traditional processes for validating models 122. However, validation computing system 170 within system 100 may provide the means for validators to package some parts of the validation process and either pass those parts to model validators or enable them to be handled by a third party or in an automated way. Yet even if only some aspects of validation are performed as a service (e.g., only some of the validation is performed by validation computing system 170 in an on-demand manner), techniques described herein still provide organizational and efficiency benefits.

In examples described herein, validation tests execute on validation computing system 170, and each of models 122 execute on respective model development computing systems 110. In other examples, however, both test scripts 187 and model 122 may execute on the same platform (e.g., locally on either validation computing system 170 or model development computing system 110). In still other examples, aspects of both test scripts 187 and models 122 may execute in a distributed fashion, across multiple computing systems.

Figure 1B:
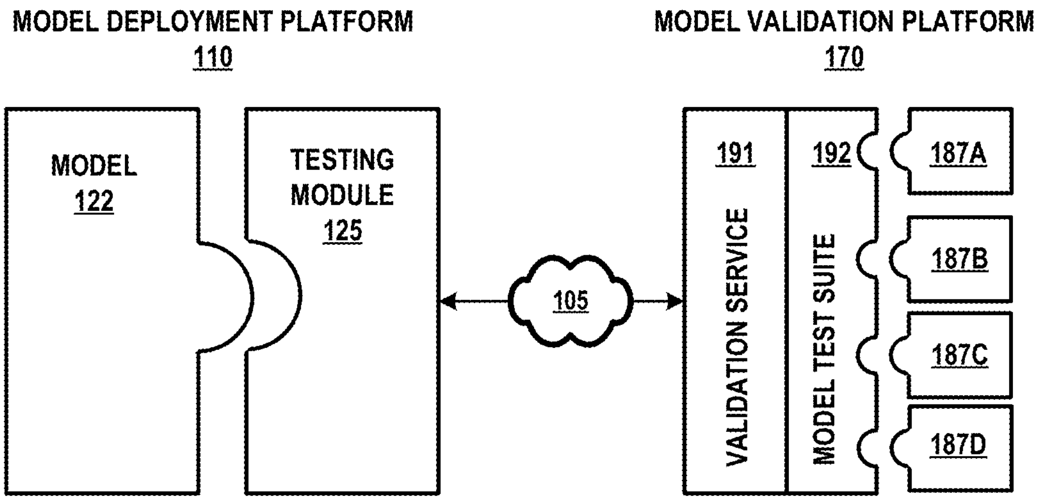
FIG. 1B is a conceptual diagram illustrating an example architecture of a model development platform and a model validation platform, connected over a network, in accordance with one or more aspects of the present disclosure.

FIG. 1B is a conceptual diagram illustrating an example architecture of a model development platform and a model validation platform, connected over a network, in accordance with one or more aspects of the present disclosure. In the example shown, a "model development platform" (corresponding to model development computing system 110 of FIG. 1A) includes one or more models 122, each wrapped by testing module 125. A "model validation platform" (corresponding to validation computing system 170) includes model validation on demand service 191 and model test suite 192. In a manner similar to that described in FIG. 1A, model validation on demand service 191 executes on validation computing system 170 and performs validation services in response to validation requests received, over network 105, from model development computing systems 110. Model test suite 192 includes a number of test scripts 187. Typically, model test suite 192 is defined by validator 179 operating validation computing system 170 (or validator device 178 in FIG. 1A). Validator 179 assembles a test composed of one or more test scripts 187 (e.g., test scripts 187A through 187D). Each of test scripts 187 may be canned tests, readily available through a repository (e.g., data store 189). In some cases, one or more of test scripts 187 may be custom tests written by one or more validators 179.

In FIG. 1B, model 122 is developed or modified to include testing module 125. In some cases, testing module 125 wraps model 122 (e.g., model 122 "plugs into" testing module 125) to gain the functionality provided by testing module 125. To enable testing module 125 to wrap model 122, a developer might modify code included within model 122 or code executing on model development computing system 110 to implement one or more software interfaces. In some examples, testing module 125 is designed to allow model developers to specify the data consumed and produced by their models without having to introduce changes to conform to a specific interface. Model developers can use testing module 125 to declare inputs, outputs, hyperparameters, runtime options, and other configurations. Preferably, testing module 125 is designed to minimize the amount of work developer 119 needs to do to prepare model 122 to communicate and/or interact with validation computing system 170. Testing module 125 may also be designed to minimize the amount of work that validator 179 has to do to use testing module 125 to validate model 122.

Once integrated into model 122, testing module 125 enables model 122 to communicate with model validation on demand service 191 over network 105 to describe its model, inputs, options, and configurations in a way that model validation on demand service 191 can understand. Model validators define model test suite 192 for model 122. Model test suite 192 may include a collection of test scripts 187 from the library of tests available (e.g., in data store 189). In such an example, validators 179 may modify parameters associated with one or more test scripts 187. For example, validator 179 may change the dictionary of "stop words" on a text attack test for a natural language processing ("NLP") model.

The techniques described herein may provide certain technical advantages. For instance, by making validation services available on demand, even if through an independent service, developers 119 may be more likely to engage in validation activities earlier and more often. Such model validation services may provide developers 119 early feedback about critical weaknesses of their models (e.g., sensitivities that do not make sense, potential issues in input data, potential fairness issues, model instability). Accordingly, techniques described herein may enable developers 119 to test more, and more often (providing benefits analogous to "unit tests for models").

The techniques described herein may also simplify the work of validators 179 and/or improve the validation process. For example, by standardizing tests, facilitating discovery, reuse, and interoperability, and enabling such tests to be executed at scale, techniques described herein may make the validation process more productive and efficient. Further, to the extent that techniques described herein are used to standardize the outputs of families of tests, interpreting the results of tests may be easier, more reliable, and simplified. In addition, if large numbers of tests can be executed across many different models 122, and the results of different tests of the same type can be compared, insights can be gained across diverse sets of models 122.

Validators 179 may employ various types of tests, which may include data tests, performance tests, benchmark tests, explainability tests, robustness tests, causality tests, fairness tests, reliability tests, and tests pertaining to qualitative models.

Data tests may involve validations on input datasets, such as data sanity checks or data quality checks. Data tests may make comparisons between datasets, provide GritBot-style explainable anomaly detection, and/or highlight covariate drift between datasets. Such tests may assess text dataset quality using stop/missing words.

Performance tests may involve assessments of predictive performance. Generally, machine learning models are highly nonlinear and deal with heterogenous populations in a single model. Overall performance testing could be supplemented with "Slice" testing to identify model weaknesses.

Benchmark tests may perform comparisons to benchmark models. Often, performance is relative, and benchmarks may be required for high risk/impact models. High Risk/Impact models may require inherently interpretable models.

Explainability tests may seek to assess explainability tools. In general, when post-hoc explainability tools are employed, they need to be tested, benchmarked and compared under various conditions. Post-hoc explainability tools themselves are models and can be misleading. High Risk/

Impact models require inherently interpretable models. Monotonicity testing may be required for certain inputs and applications.

Robustness tests may test for overfitting. For example, static training-testing data split can easily produce undetected model overfit. Such tests may check for the smallest perturbation that generates the largest error, including counter factual testing. Adversarial testing may be required if models will operate under adversarial environment.

Causality tests may assess whether one variable causes another. Models may be used different environments to determine model stability, which may require causality.

Fairness tests may test for disparate impact without requiring modeler access to protected group data. Such tests may involve basic diagnostics by a variable: equal opportunity ratio, predictive parity ratio, predictive equality ratio, accuracy equality ratio, and others.

Reliability tests may assess confidence bands, since models with tighter confidence bands are often preferred.

Quantitative models tests may be built on Excel by personnel that might not have access to developer tools and may have limited programming experience. As a consequence, additional tooling may be provided to make these types of tests accessible. Such tests or tools may involve enabling assertions on inputs and outputs, backtesting, and sensitivity tests (e.g., outputs are observed against different types of shocks applied to inputs). In some examples, report generation and/or attestation components may be used that generate a full report summarizing the results various types of tests. Preferably, specific aspects of the results of various tests may be accessible through an API or otherwise retrievable on demand. Such a capability may enable a model validator to programmatically retrieve parts of a given set of test results for embedding into a validation report.

Figure 2:
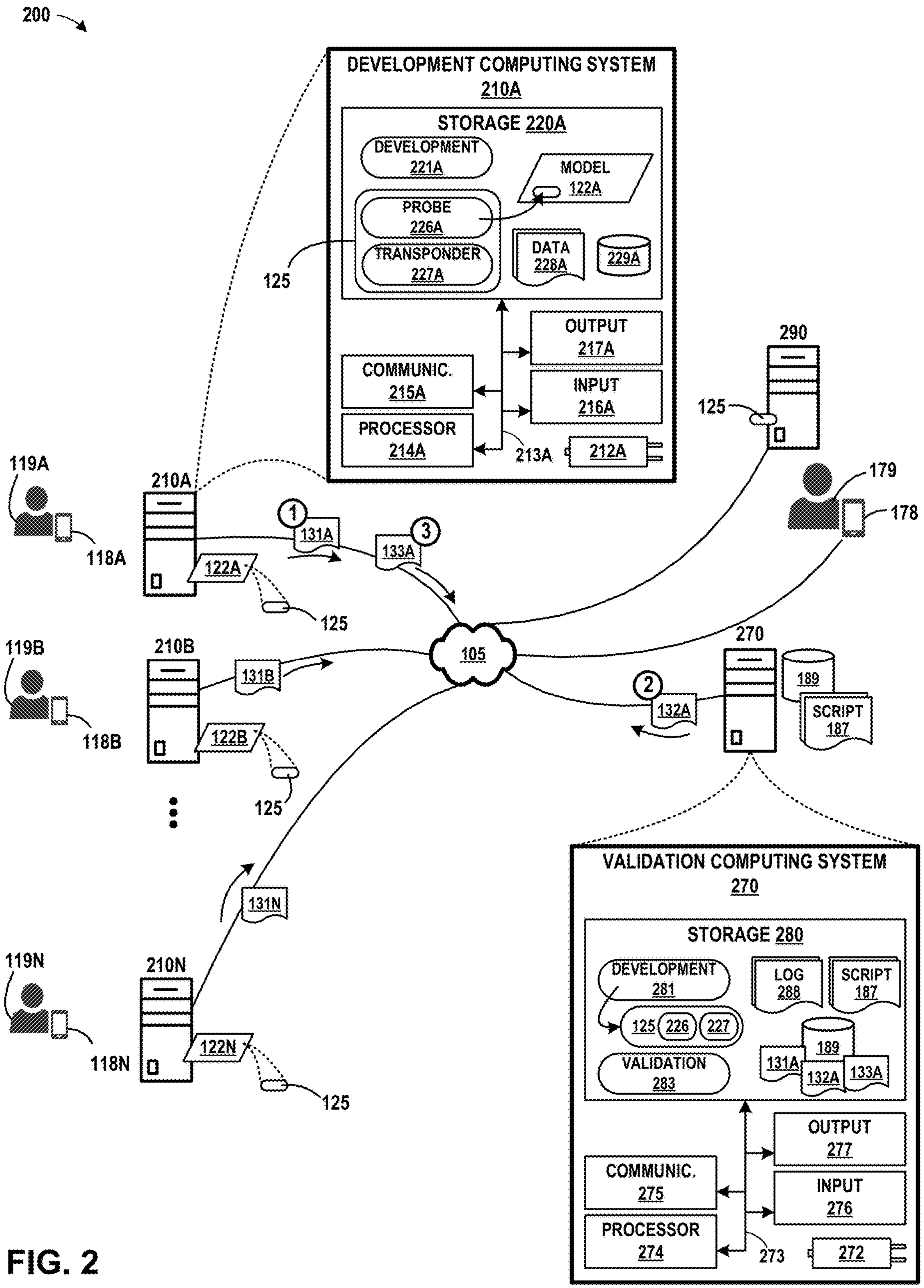
FIG. 2 is a block diagram illustrating a system in which validation services are provided to each of a number of other computing systems, in accordance with one or more aspects of the present disclosure.

FIG. 2 is a block diagram illustrating a system in which validation services are provided to each of a number of other computing systems, in accordance with one or more aspects of the present disclosure. System 200 of FIG. 2 may be described as an example or alternative implementation of system 100 of FIG. 1A. System 200 includes model development computing systems 210A through 210N, validation computing system 270, and publication computing system 290, all in communication over network 105. In the example of FIG. 2, system 200 includes many of the same elements described in FIG. 1A, and elements illustrated in FIG. 2 may correspond to earlier-illustrated elements that are identified by like-numbered reference numerals. In general, such like-numbered elements may represent previously-described elements in a manner consistent with prior descriptions, although in some examples, such elements may be implemented differently or involve alternative implementations with more, fewer, and/or different capabilities and/or attributes. Accordingly, one or more aspects of FIG. 2 may be described herein within the context of FIG. 1A.

Validation computing system 270, illustrated in FIG. 2, may correspond to validation computing system 170 of FIG. 1A. Similarly, model development computing systems 210A through 210N (collectively, "model development computing systems 210") may correspond to model development computing systems 110A through 110N of FIG. 1A, respectively. These devices, systems, and/or components may be implemented in a manner consistent with the description of the corresponding system provided in connection with FIG. 1A, although in some examples such systems may involve alternative implementations with more, fewer, and/or different capabilities. For ease of illustration, only validation computing system 270 and model development computing systems 210A through 210N are shown in FIG. 2, with only validation computing system 270 and model development computing system 210A illustrated in significant detail. However, in other examples, any number of model development computing systems 210 may be included within system 200, and techniques described herein may apply to a system having any number of model development computing systems 210 or validation computing systems 270. Further descriptions of model development computing system 210A may correspondingly apply to each of model development computing systems 210B through 210N.

Each of validation computing system 270, model development computing systems 210A through 210N, and publication computing system 290 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, any of validation computing system 270 or model development computing systems 210A through 210N may represent a cloud computing system, server farm, and/or server cluster (or portion thereof) that provides services to client devices and other devices or systems. In other examples, such systems may represent or be implemented through one or more virtualized compute instances (e.g., virtual machines, containers) of a data center, cloud computing system, server farm, and/or server cluster.

In the example of FIG. 2, validation computing system 270 may include power source 272, one or more processors 274, one or more communication units 275, one or more input devices 276, one or more output devices 277, and one or more storage devices 280. Storage devices 280 may include development module 281 and validation module 283. Data store 189 may store various items of data described elsewhere herein, including, for example, one or more test requests 131, test instructions 132, test responses 133, test scripts 187, and log data 288.

Power source 272 may provide power to one or more components of computing system 271. Power source 272 may receive power from the primary alternating current (AC) power supply in a building, home, or other location. In other examples, power source 272 may be a battery or a device that supplies direct current (DC). In still further examples, computing system 271 and/or power source 272 may receive power from another source. One or more of the devices or components illustrated within computing system 271 may be connected to power source 272, and/or may receive power from power source 272. Power source 272 may have intelligent power management or consumption capabilities, and such features may be controlled, accessed, or adjusted by one or more modules of computing system 271 and/or by one or more processors 274 to intelligently consume, allocate, supply, or otherwise manage power.

One or more processors 274 of computing system 271 may implement functionality and/or execute instructions associated with computing system 271 or associated with one or more modules illustrated herein and/or described below. One or more processors 274 may be, may be part of, and/or may include processing circuitry that performs operations in accordance with one or more aspects of the present disclosure. Examples of processors 274 include microprocessors, application processors, display controllers, auxiliary processors, one or more sensor hubs, and any other hardware configured to function as a processor, a processing unit, or a processing device. Computing system 271 may use one or more processors 274 to perform operations in accordance with one or more aspects of the present disclosure using software, hardware, firmware, or a mixture of hardware, software, and firmware residing in and/or executing at computing system 271.

One or more communication units 275 of computing system 271 may communicate with devices external to computing system 271 by transmitting and/or receiving data, and may operate, in some respects, as both an input device and an output device. In some examples, communication unit 275 may communicate with other devices over a network. In other examples, communication units 275 may send and/or receive radio signals on a radio network such as a cellular radio network. In other examples, communication units 275 of computing system 271 may transmit and/or receive satellite signals on a satellite network such as a Global Positioning System (GPS) network.

One or more input devices 276 may represent any input devices of computing system 271 not otherwise separately described herein. One or more input devices 276 may generate, receive, and/or process input from any type of device capable of detecting input from a human or machine. For example, one or more input devices 276 may generate, receive, and/or process input in the form of electrical, physical, audio, image, and/or visual input (e.g., peripheral device, keyboard, microphone, camera).

One or more output devices 277 may represent any output devices of computing systems 271 not otherwise separately described herein. One or more output devices 277 may generate, receive, and/or process output from any type of device capable of outputting information to a human or machine. For example, one or more output devices 277 may generate, receive, and/or process output in the form of electrical and/or physical output (e.g., peripheral device, actuator).

One or more storage devices 280 within computing system 271 may store information for processing during operation of computing system 271. Storage devices 280 may store program instructions and/or data associated with one or more of the modules described in accordance with one or more aspects of this disclosure. One or more processors 274 and one or more storage devices 280 may provide an operating environment or platform for such modules, which may be implemented as software, but may in some examples include any combination of hardware, firmware, and software. One or more processors 274 may execute instructions and one or more storage devices 280 may store instructions and/or data of one or more modules. The combination of processors 274 and storage devices 280 may retrieve, store, and/or execute the instructions and/or data of one or more applications, modules, or software. Processors 274 and/or storage devices 280 may also be operably coupled to one or more other software and/or hardware components, including, but not limited to, one or more of the components of computing system 271 and/or one or more devices or systems illustrated as being connected to computing system 271.

In some examples, one or more storage devices 280 are temporary memories, which may mean that a primary purpose of the one or more storage devices is not long-term storage. Storage devices 280 of computing system 271 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 280, in some examples, also include one or more computer-readable storage media. Storage devices 280 may be configured to store larger amounts of information than volatile memory. Storage devices 280 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Development module 281 may perform functions enabling or assisting with development or maintenance of testing module 125. Accordingly, testing module 125 may be generated as a result of development efforts undertaken in response to input (programming activities) from a developer (e.g., validator 179). In some examples, testing module 125 may include probe module 226 and transponder module 227.

Validation module 283 may perform functions relating to validating one or more models 122 upon receiving a request for a corresponding one of model development computing systems 210. Data store 189 may represent any suitable data structure or storage medium for storing information related to validation of one or more model development computing systems 210, and may include various test scripts, data, logs, test instructions 132, test instructions 132, and test responses 133. The information stored in data store 189 may be searchable and/or categorized such that one or more modules within validation computing system 270 may provide an input requesting information from data store 189, and in response to the input, receive information stored within data store 189. Data store 189 may be primarily maintained by validation module 283.

In the example of FIG. 2, model development computing system 210A includes power source 212A, one or more processors 214A, one or more communication units 215A, one or more input devices 216A, one or more output devices 217A, and one or more storage devices 220A. Storage devices 220A may include development module 221A, testing module 125, model 122A, 228A, and data store 229A. Data 228A may represent any data associated with development of one or more development modules 221A, and may include parameters, configuration information, training data, validation data sets, test request 131A, test instruction 132A, and/or test response 133A. Testing module 125 may include probe module 226A and transponder module 227A, perhaps configured appropriately to operate with model 122A. Data store 229A may store various items of data described herein, including, for example, models 122A and/or data relating to models 122A, along with test requests 131A, test instructions 132A, and test responses 133A.

Components of model development computing system 210A may correspond to descriptions of similar components described above in connection with the description of validation computing system 270. For example, power source 212A may provide power to one or more components of computing system 210A. One or more processors 214A of computing system 210A may implement functionality and/or execute instructions associated with computing system 210A or associated with one or more modules illustrated herein and/or described below. One or more communication units 215A of computing system 210A may communicate with devices external to computing system 210A by transmitting and/or receiving data over a network or otherwise. One or more input devices 216A may represent any input devices of computing system 210A not otherwise separately described herein. Input devices 216A may generate, receive, and/or process input, and output devices 217A may represent any output devices of computing system 210A. One or more storage devices 220A within computing system 210A may store program instructions and/or data associated with one or more of the modules of storage devices 220A in accordance with one or more aspects of this disclosure.

Each of these components, devices, and/or modules described with respect to model development computing system 210A may be implemented in a manner similar to or consistent with the description of other components or elements described herein. Further, although not specifically illustrated in FIG. 2, each of model development computing systems 210B through 210N may be implemented in a manner similar to that of model development computing system 210A. Accordingly, descriptions herein with respect to computing system 210A may correspondingly apply to one or more other computing systems 210.

In accordance with one or aspects of the present disclosure, validator 179 may develop testing module 125. For instance, in an example that can be described in the context of FIG. 2, communication unit 275 of validation computing system 270 detects a signal over network 105. Communication unit 275A outputs information about the signal to development module 281. Development module 281 determines that the signal corresponds to development activity, which may be the result of validator 179 (or another software developer) interacting with validator device 178 to write, specify, and/or edit programming code as part of a software development process. In some examples, development module 281 may output to validator device 178 over network 105 a series of user interfaces enabling and/or facilitating development activity by a software developer. Development module 281 creates, based on interactions from validator 179 and development activity generally, testing module 125. Development of testing module 125 may be performed by validator 179, but in most cases, testing module 125 may be developed and maintained by independent or at least different software developers that have knowledge of how validation is to be performed. As described herein, testing module 125 is designed to integrate into models 122 developed by each of model development computing systems 110, thereby enabling validation computing system 270 to communicate with such models through testing module 125.

In some examples, testing module 125 includes multiple components, including probe module 226 and transponder module 227, where probe module 226 may be plugged directly into a given model 122, such as through an API, an interface implementation, a software library, or other mechanism to extend functionality of a given model 122 with capabilities of probe module 226. Transponder module 227 may manage communication between each respective model development computing system 210 and validation computing system 270. For instance, transponder module 227 may communicate, from within testing module 125 at model development computing system 210A, with validation computing system 270 to request validation, receive instructions, and output responses to such instructions. In some examples, testing module 125 executing at one of development computing systems 110 or 210 responds to requests for information received from validation computing system 270. Alternatively, or in addition, testing module 125 (or transponder module 227 within module 125) may send information to validation computing system 270 without having received a request for the information. Such functionality may be used for various purposes, including model telemonitoring.

Validation computing system 270 may publish testing module 125. For instance, referring again to FIG. 2, development module 281 causes communication unit 275 to output a series of signals over network 105. Publication computing system 290 detects a signal over network 105 and determines that the signals include testing module 125. Publication computing system 290 further determines that the signals correspond to a request to publish or otherwise make testing module 125 available to other computing systems, such as each of model development computing systems 110. Publication computing system 290 publishes testing module 125 and thereby makes testing module 125 available to each of model development computing systems 110.

Validator 179 may develop one or more test scripts 287. For instance, continuing with the example being described in the context of FIG. 2, communication unit 275 of validation computing system 270 detects a series of signals over network 105. Development module 281 determines that the series of signals correspond to one or more instructions that can be used to test one or more types of models 122. Such instructions may be scripts or computer code, written by validator 179, that cause testing module 125, described above, to interact with one or more models 122, such as those developed at model development computing systems 210. Development module 281 uses such information to generate one or more test scripts 287, each of which may be part of a validation test suite for one or more types of models 122. For example, one or more test scripts 287 may be designed to instruct testing module 125, embedded within or integrated within model 122A, to perform various functions that enable validation of model 122A. Development module 281 stores one or more test scripts 287 within data store 189 for later use and/or reference.

In some examples, data store 189 may serve as a repository where validator 179 and other validators may browse existing test scripts 287, learn about their functionality, and determine whether they might apply to an effort to validate one or more models 122. Such a repository may be made available to other validators, and may include descriptions of how such test scripts 287 may be used generally, or in specific contexts. For example, the manner in which a given test script 287 operates might be controlled, modified, or tuned through various parameters or configuration settings. The repository may include descriptions of and/or information about such parameters and configuration settings, thereby enabling validators 179 to configure a selected test script 287 to be used appropriately validating one or more models 122.

One or more of model development computing systems 210 may develop models 122. For instance, again referring to the example being described in the context of FIG. 2, model development computing system 210A detects signals from developer device 118A. Model development computing system 210A determines that the signals correspond to development and/or model development activity (e.g., creating, selecting, configuring, and/or training a machine learning model). Model development computing system 210A generates, based on the development activity, one or more models 122A.

Similarly, model development computing system 210B detects signals from developer device 118B that it determines correspond to interactions with developer device 118B by developer 119B. Model development computing system 210B generates, based on such interactions (which may originate from developer 119B), one or more models 122B. In general, any of model development computing systems 210 generate one or more models 122 based on interactions and/or development activity of one or more developers 119 (e.g., model development computing system 210N develops model 122N, based on development activity of developer 119N).

When developing each of models 122, each respective model development computing system 210 integrates testing module 125 into the model being developed. For instance, again with reference to the example being described in connection with FIG. 2, development module 221A of model development computing system 210A causes communication unit 215A to output a signal over network 105. Publication computing system 290 detects a signal that it determines corresponds to a request for testing module 125. In some examples, publication computing system 290 may determine that the request received is for a specific version of testing module 125 (e.g., corresponding to a particular programming language, platform, API version, or other variant of testing module 125 that will best work with models 122 developed at model development computing system 210A). Publication computing system 290 outputs a signal over network 105. Communication unit 215A detects a signal and outputs information about the signal to development module 221A. Development module 221A determines that the signal includes the requested version of testing module 125. Development module 221A integrates testing module 125 into model 122A, often based on interactions from developer device 118A in response to input from developer 119A.

In some examples, integration of testing module 125A into model 122A may require developer 119A to implement functions in a programming interface. For instance, in such an example and again referring to FIG. 2, input device 216A detects input and outputs information about the input to development module 221A. Development module 221A modifies model 122A to implement one or functions specified by a programming interface, or otherwise modifies or adjusts model 122A to enable testing module 125A to execute within or in conjunction with model 122A. Implementing an interface might require developer 119A to write code to enable testing module 125A to perform certain operations, such as making a prediction (e.g., either a point estimate or a distribution), returning information about the training sets used by model 122A, or providing information about capabilities of model 122A. In other examples, if code is provided to implement additional functions or functionality, again based on input or development activity of developer 119A, testing module 125 may be able to more deeply interact with model 122A and perform more exhaustive tests of model 122A and validation operations pertaining to model 122A. In such an example, validation computing system 270 may correspondingly learn more about the operation of model 122A during testing, and reach a higher level of confidence in the results of its testing of model 122A.

Each of the other model development computing systems 210 (e.g., model development computing system 210B through 210N) may similarly integrate the same or similar version of testing module 125 into corresponding models 122 developed at each respective model development computing system 210. Such integration of testing modules 125, at model development computing systems 210B through 210N, may be more or less extensive than that of model development computing system 210A.

In accordance with one or more aspects of the present disclosure, model development computing system 210A may request validation of model 122A. For instance, again referring to the example being described in the context of FIG. 2, development module 221A causes communication unit 215A to output test request 131A over network 105 to validation computing system 270. In some examples, test request 131A may be transmitted over network 105 automatically or periodically during development of one or more models at model development computing system 210A. In other examples, test request 131A may be transmitted in response to user input (e.g., input received from developer 219A operating developer device 218A). Further, although development module 221A may cause test request 131A to be transmitted over network 105, in other examples, other modules may cause such a request to be made (e.g., testing module 125 or even a model being tested).

Validation computing system 270 may initiate testing and/or validation of model 122A in response to test request 131A. For instance, still referring to FIG. 2, communication unit 275 of validation computing system 270 detects a signal over network 105 and outputs information about the signal to validation module 283. Validation module 283 determines that the signal corresponds to test request 131A received from model development computing system 210A, requesting validation services to be performed on model 122A. Validation module 283 evaluates test request 131A and selects one or more test scripts 287 stored within data store 189. Validation module 283 causes communication unit 275 to output one or more test instructions 132A, which may correspond to the selected test scripts 187, over network 105 to model development computing system 210A.

Model development computing system 210A may perform operations as directed by validation computing system 270. For instance, again referring to FIG. 2, communication unit 215 of model development computing system 210A detects signals over network 105 and outputs information about the signals to transponder module 227A. Transponder module 227A determines that the signals include one or more test instructions 132A. Transponder module 227A outputs information about test instructions 132A to probe module 226A. Probe module 226A interacts with model 122A to execute test instructions 132A, and as a result, outputs validation information to transponder module 227A. Transponder module 227A causes communication unit 215 to output test response 133A over network 105, where test response 133A includes the validation information generated in response to executing test instruction 132A.

Validation computing system 270 may assess model 122A based on test response 133A. For instance, again with reference to FIG. 2, communication unit 275 of validation computing system 270 detects test response 133A over network 105. Communication unit 275A outputs information about test response 133 to validation module 283. Validation module 283 determines that the information corresponds to a response to test request 131A, previously sent to model development computing system 210A over network 105. Validation module 283 uses the information to assess, validate, or otherwise evaluate model 122A and/or its operation. Validation module 283 may cause communication unit 275 to output further test instructions 132A over network 105 to model development computing system 210A, which may prompt additional test responses 133A to be sent by model development computing system 210A to validation computing system 270. Validation module 283 may also use such additional test responses 133 to assess, validate, or otherwise evaluate model 122A. Validation module 283 may create one or more records of interactions between model development computing system 210A and validation computing system 270, which may include information about test requests 131A, test instructions 132A, and test responses 133A. Validation module 283 stores such records within data store 189 as log data 288.

Similarly, validation computing system 270 may perform validation tests on each of models 122. For instance, referring again to FIG. 2, each of models 122B through 122N may issue to validation computing system 270 a respective test request 131. Validation module 283 of validation computing system 270 processes each test request 131 and identifies one or more test instructions 132 that are appropriate for each of models 122 at model development computing systems 210B through 210N. Validation module 283 causes validation computing system 270 to output respective test instructions 132 to each of model development computing systems 210. Each of model development computing systems 210 respond with respective test responses 133. Validation module 283 uses each test responses 133 to validate or assess corresponding models 122. Validation module 283 may determine that some of models 122 can be validated, and validation module 283 may also determine that some of models 122 cannot be validated.

When assessing each of models 122, validation computing system 270 may determine information about weaknesses of models 122, sensitivities of models 122 that may be inconsistent with correct operations, potential issues in input data, potential fairness issues, model instabilities, or other information. In one example, validation module 283 of validation computing system 270 may determine that a specific model 122 (e.g., model 122A) has been validated, which may mean merely that model 122A has not been determined to be unacceptable. In such an example, validation may enable model 122A to undergo further tests, proceed to formal model validation, and/or to proceed to implementation and/or deployment in a production environment. For those models 122 that are not able to be validated, such models 122 might not proceed to formal model validation. In some cases, models 122 that have not been validated might be revised and reassessed.

In some examples, validation computing system 270 (or another computing system) may schedule tests intelligently, in a backend computing cluster. Such tests can be scheduled and executed sequentially, in parallel, or following a complex workflow. Validation computing system 270 may also enable information to be passed between logic, code, or systems executing tests to enhance functionality or testing capabilities. For example, a variable importance test may share with all other tests a ranking of importance of different variables, which then another test (e.g., a model "explainability" test) may leverage in appropriate ways, such as by restricting the model explanations to only the variables that matter.

Communications described herein, such as those between development computing systems 210 and validation computing system 270 may be performed using any appropriate protocol. In some examples, a low latency/high throughput communications protocol that is well suited for large data operations may be used. In some examples, such a protocol could be the Arrow Flight protocol. Apache Arrow is a language-agnostic software framework for developing data analytics, and Arrow Flight is a remote procedure call (RPC) framework for high-performance data services based on Arrow data.

Modules illustrated in FIG. 2 (e.g., development module 281, validation module 283, development module 221A, 125, probe module 226A, and/or transponder module 227A) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 3A is an example source code listing illustrating code that a model developer might use to enable an existing model to be validated remotely, in accordance with one or more aspects of the present disclosure. FIG. 3A illustrates source code listing 310, where a toolkit is used to wrap an existing model, entitled "BotModel," with an example model validation probe, which may correspond to testing module 125 of FIG. 1A, FIG. 1B, and/or FIG. 2. Although in some examples testing module 125 may be implemented as an application programming interface, in other examples, such as illustrated in FIG. 3A, testing module 125 may be designed to allow developers 119 to describe how their model works in a convenient and non-invasive way, rather than forcing developers 119 to conform to requirements of an API. Testing module 125 may be made available in a variety of programming languages. Alternatively, testing module 125 may be made available in some of the more popular model development languages (e.g., Python), and a translation or wrapping mechanism may be used to make testing module 125 available for use with other programming languages. Preferably, a framework provided by testing module 125 does as much work as possible in terms of data conversions, serialization, model execution, and other tasks, so that neither developers 119 nor validators 179 have to spend significant time on implementing such functionality.

In FIG. 3A, one or more developers 119 might interact directly with model development computing systems 110 (or through developer devices 118) to modify code within model 122 to implement an interface and/or extend a model type from an assortment of convenience model archetypes or a generic type (see source code 311). In the constructor of the class shown, model 122 is initialized (see source code 312).

Developer 119 may configure model 122 to return the training dataset (see source code 313). In some examples, convenience abstractions may be provided so that developer 119 can return data (e.g., as in source code 313) in a wide variety of formats (rather than imposing one format on developer 119) and declare a schema as well as semantic information (e.g., tag a field as a target variable, a weight, a dimension for analysis not used in the model, etc.).

Developer 119 may configure model 122 to return information about model 122 (see source code 314). Information about model 122 may be returned using convenience abstractions that simplify declaring capabilities of model 122 (e.g., in some cases, the information may indicate whether model 122 can handle missing input values, or whether model 122 can produce distributional outputs).

Developer 119 may configure model 122 to return predictions, in the form of either point estimates and/or distributional estimates (see source code 315). Methods listed in FIG. 3A return both point estimates and distributional estimates. For the Bot corresponding to the model being modified, these methods reduce to predicting the class and the probabilities of all possible classes, respectively.

Preferably, testing module 125 is designed to minimize the amount of work needed from developer 119 to implement the functionality required to interact with validation computing system 170. Doing so may involve ensuring testing module 125 (or any framework used by testing module 125) fits well in existing constructs used by developers 119 for model training, tuning, reproducible research.

FIG. 3B is an alternative example source code listing illustrating code that a model developer might use to enable an existing model to be validated remotely, in accordance with one or more aspects of the present disclosure. The source code listing illustrated in FIG. 3B is similar to that of FIG. 3A, with some additional code and other changes. For example, developer 119 may configure model 122 to retrain an existing "BotModel" (see source code 316).

FIG. 3C illustrates an example dictionary data structure listing syntactic and semantic information about data that might be used in an example model, in accordance with one or more aspects of the present disclosure. In the example shown in FIG. 3C, dictionary data structure 320 is implemented as a YAML ("YAML Ain't Markup Language") definition. Other implementations and formats are possible. Dictionary data structure 320 may enable developer 119 to express syntactic and semantic information about the data used by a model (e.g., one or more of models 122). In some examples, the data may be based on or expressed pursuant to "FrictionlessData" specifications, but other formats are possible.

In some examples, data abstractions (e.g., Dataset and DataDictionary) allow developers 119 to specify the data consumed and produced by their models (e.g., models 122) without having to introduce changes to conform to a specific interface. In such an example, an objective is reducing or minimizing the amount of development work required to enable model 122 to interact with validation computing system 170 (thereby gaining the benefits of the validation services provided by validation computing system 170). Another objective is reducing or minimizing the amount of work validator 179 must do to use model 122 (thereby gaining the benefits of structure, cohesion, and scale to internally developed validation capabilities). Preferably, developers 119 describe their data rather than having to transform their data to a prespecified format, taking advantage of translation and conversion services that might be provided by validation computing system 170 (or a toolkit associated with testing module 125). Developers 119 may describe their data through a data dictionary abstraction that allows model developers to annotate their data with syntactic and semantic information. Testing module 125 or validation computing system 170 may include software tools or other functionality, enabling developers 119 to get an initial "intelligent" guess of data formats from existing data, which the model developer can then further edit and annotate. Validator 179 may extract the data from the datasets provided by each of models 122 in the format that is most convenient for analysis by validator 179.

In the example shown in FIG. 3C, information about field names, data types, and basic constraints may be provided for each field (see "fields:" section near the top of dictionary data structure 320). In addition, a data configuration extension provides information about the lineage and purpose of the different data elements used, consumed, and/or generated by the corresponding model 122 (see "config:" section near the bottom of dictionary data structure 320). For instance, in some examples, the data configuration section may identify variables that are considered "protected" and can therefore be used for fairness analyses but not as part of the model, weights, identifiers, and/or other attributes. The configuration illustrated in FIG. 3C may also be used to define additional complex validation constraints.

When defining a test suite, validator 179 may select and/or evaluate the applicability of one or more existing test scripts 187. In some examples, validator 179 may select various test scripts 187, perhaps adjusting such test scripts 187 by configuring test parameters and dials, as well as modifying pass/fail criteria (and explanations for developers 119). Data store 189 (see FIG. 1A) may serve as a test repository where validators 179 can browse through existing tests and quickly learn about the capabilities of such tests, along with the configurable options, settings, and dials are available to alter the behavior of such tests. In such an example, validators 179 seeking to use existing tests can do so without having to dig into the intricacies of large code snippets or notebooks, thereby simplifying the task of "shopping around" for existing test scripts 187. Accordingly, validator 179 may define a validation suite by selecting a number of tests available within data store 189 and configuring the selected tests. Assembling a test suite from existing tests can thus be performed in some examples without any coding. Once a test suite is defined, developer 119 may be able to see a published description of test scripts 187, which may include commentary (e.g., perhaps provided by the validator that originally wrote the test scripts) about the rationale for the test scripts 187 included within the test suite.

In general, however, validation test suites may be a combination of existing, and new tests. Data store 189 may be implemented as a code repository (e.g., GitHub), where developers (e.g., validators 179) can commit an implementation of a new test script 187 or a modification to an existing test script 187. A validator may define a new validation test by encapsulating new or existing code in a validation test object. Once encapsulated, the new test may be self-contained, and may have clear inputs and clear outputs that make it suitable for automation and execution at scale. Upon committing a new or modified test to the code repository, the committed test script may itself undergo some validations. If the test script passes such validations, the new or modified test script may be published to the validation on demand system (e.g., as a new repository test script 187 included within data store 189). Publication may also trigger generation of documentation, preferably automatically. Once published, the new test script 187 may be made available to be part of one or more validation suites. By publishing validation tests, validators 179 make them discoverable as a part of a catalog of tests, available within data store 189.

FIG. 3D illustrates an alternative metadata specification listing syntactic and semantic information about data that might be used in an example model, in accordance with one or more aspects of the present disclosure. The protobuf specification 329, illustrated in FIG. 3D, may represent a richer specification than the YAML specification illustrated in FIG. 3C. Protobuf specification 329 includes various annotations, describing aspects of the specification and corresponding data. FIG. 3E illustrates an example validation test code listing, in accordance with one or more aspects of the present disclosure. FIG. 3E illustrates validation test code listing 330, which may be an example implementation of a validation test, such as one that might be written by one or more validators 179. In some examples, validation test code listing 330 may enable a model to be configured to be executed by validation computing system 170 of FIG. 1A or validation computing system 270 of FIG. 2. Preferably, implementing an interface to enable access to validation services requires minimal code to be written by validator 179, thereby minimizing the amount of work that validator 179 has to do to access services provided by validation computing system 170 (or validation computing system 270). In some examples, development module 281 of validation computing system 270 (see FIG. 2) may be implemented with a taxonomy of common test types. Validator 179 may use any of these test types in validation test code listing 330, or may define new ones.

In the specific example of FIG. 3E, validation test code listing 330 of FIG. 3E illustrates an extension of the TextAttackValidation test type (see source code 331). To implement "TextAttackValidation," validator 179 may define a method with the following signature (see source code 332):

Validate (model, . . . )-->ValidationResults

In the above signature, "model" is a remote model generic or one of a more specific type. Also in the above signature, " . . . " denotes arbitrary test "dials" that validator 179 may wish to expose. In some examples, development module 281 of validation computing system 270 may, during development, autogenerate documentation from the method signature and docstrings (see source code 333). Validator 179 may implement code interrogating the model and the data used by the model (see source code 334). In some examples, validator 179 may leverage proprietary and/or internally-developed foundational libraries as well as any others deemed useful to compose the test.

Validator 179 may implement code to report results (see source code 335). In some examples, once execution is complete, validation computing system 170 validator reports results of the test (e.g., to validator device 178 and/or validator 179), and may encapsulate the results in a "ValidationResults" object. Convenience specializations of this class (e.g., TextAttackValidationResults( )) may be made available to simplify the work of validator 179. In some examples, development module 281 (see FIG. 2) may enable multiple ways to report results, rather than imposing an API on validator 179, and requiring compliance with the API. Accordingly, validator 179 may be able to adapt existing code more easily, with minimal changes. Development module 281 may, in some examples, operate as a universal adaptor of sorts, translating results generated as a results of executing tests.

Figure 4:
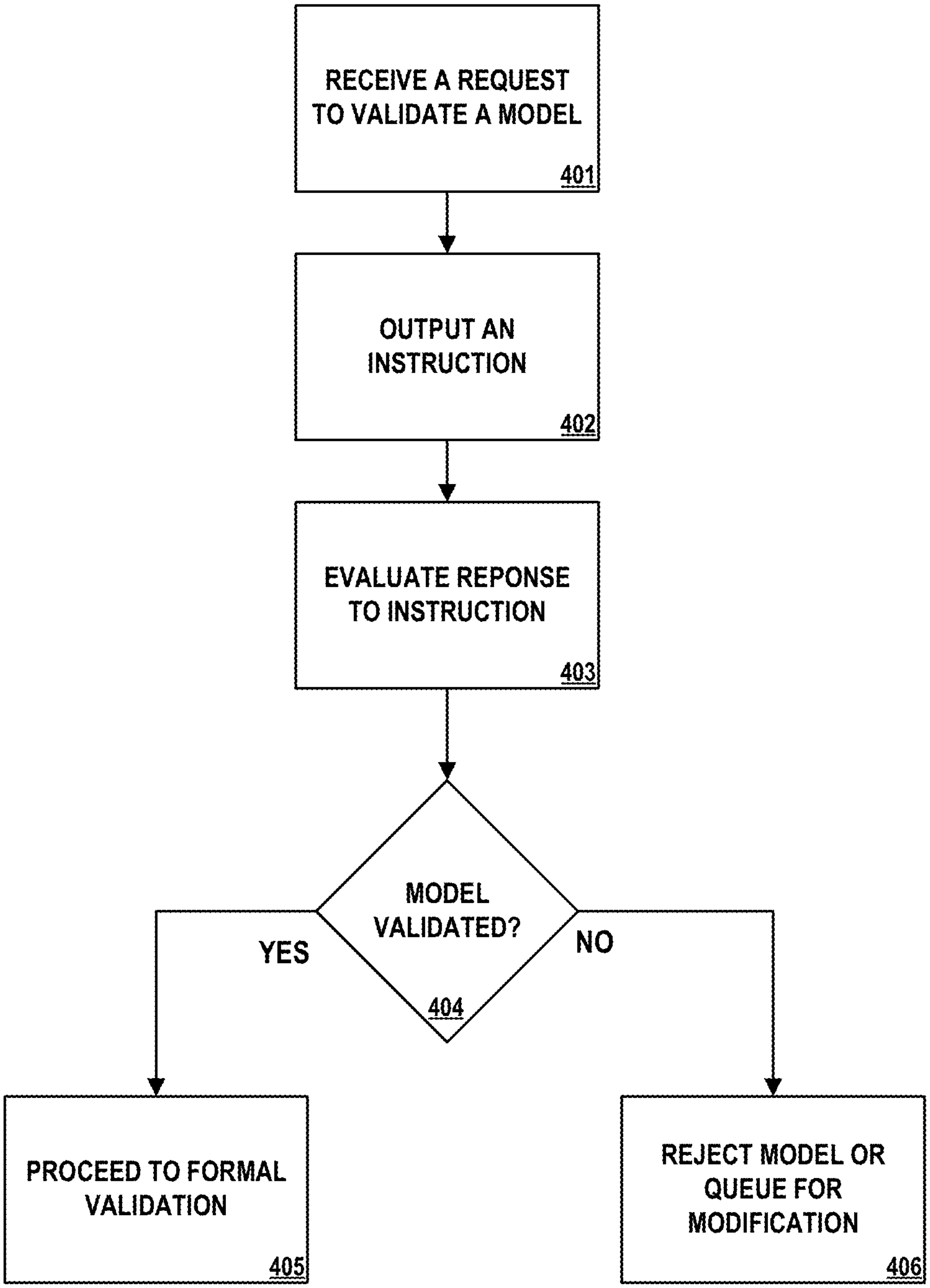
FIG. 4 is a flow diagram illustrating operations performed by an example validation computing system in accordance with one or more aspects of the present disclosure.

FIG. 4 is a flow diagram illustrating operations performed by an example validation computing system in accordance with one or more aspects of the present disclosure. FIG. 4 is described below within the context of validation computing system 170 of FIG. 1A. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, validation computing system 170 may receive, from model development computing system 110A, a request to validate model 122A (401). Responsive to receiving the request, validation computing system 170 may output an instruction to model development computing system 110A (402). Model development computing system 110A (or specifically, testing module 125 integrated within model 122A) may execute the instruction, interacting with model 122A.

Validation computing system 170 may receive a response to the instruction from model development computing system 110A, representing the results of execution of the instruction by model 122A. Validation computing system 170 may evaluate the response (403). Validation computing system 170 may communicate additional instructions to model development computing system 110A, which may prompt additional responses. Validation computing system 170 may evaluate such additional responses.

Validation computing system 170 may determine whether model 122A can be validated (404). If validation computing system 170 determines that model 122A can be validated, model 122A may proceed to formal validation, or to production (YES path from 404, and 405). If validation computing system 170 determines that model 122A cannot be validated, validation computing system 170 may reject model 122A, or queue model 122A for further modification by model development computing system 110A (NO path from 404, and 405).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., model development computing systems 110, validation computing systems 170, developer devices 118, validator devices 178, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The illustrations included herein each depict at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the illustrations and/or may include additional devices and/or components not shown in the illustrations.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A development computing system comprising processing circuitry and a storage device, wherein the processing circuitry has access to the storage device and is configured to:

enable development of a model;

access, over a network, information about a testing module that is used to test the model under development;

integrate, based on the information about the testing module, the testing module into the model under development;

receive a request for model telemonitoring information over the network from a validation system;

responsive to receiving the request for model telemonitoring information, output, over the network to the validation system by the testing module and during development of the model, responsive model telemonitoring data;

output, by the testing module and over the network to the validation system, a request for model validation services;

responsive to outputting the request for model validation services, receive a test instruction; and execute the test instruction.

2. The development computing system of claim 1, wherein the processing circuitry is further configured to:

output, over the network to the validation system and in response to executing the test instruction, test response data.

3. The development computing system of claim 1, wherein the responsive model telemonitoring data is a first set of model telemonitoring data, and wherein the processing circuitry is further configured to:

automatically output a second set of model telemonitoring data without having received a request for the second set of model telemonitoring data.

4. The development computing system of claim 1, wherein to execute the test instruction, the processing circuitry is further configured to:

enable the model under development to make a prediction.

5. The development computing system of claim 4, wherein the processing circuitry is further configured to:

output, over the network to the validation system, information about the prediction, wherein the information about the prediction includes at least one of a point estimate and a distribution estimate.

6. A method comprising:

communicating, by a validation computing system, with a plurality of development systems over a network;

outputting, by the validation computing system and over the network to each of the plurality of development systems, a request for model telemonitoring data;

receiving, by the validation computing system and over the network from each of the plurality of development systems, responsive model telemonitoring data;

receiving, by the validation computing system and from a development system included in the plurality of development systems, a request to perform a validation test on a model configured to execute on the development system included in the plurality of development systems;

outputting, by the validation computing system to the development system included in the plurality of development systems and in response to receiving the request, a test instruction; and receiving, by the validation computing system and from the development system included in the plurality of development systems, test response data generated in response to executing the test instruction.

7. The method of claim 6, wherein the development system included in the plurality of development systems is a first development system, and wherein the test instruction is a first test instruction, the method further comprising:

receiving, by the validation computing system and from a second development system included in the plurality of development systems, a request to perform a validation test on a model configured to execute on the second development system included in the plurality of development systems;

outputting, by the validation computing system to the second development system included in the plurality of development systems and in response to receiving the request, a second test instruction; and receiving, by the validation computing system and from the second development system included in the plurality of development systems, test response data generated in response to executing the second test instruction.

8. The method of claim 7, further comprising:

enabling the first development system included in the plurality of development systems to execute the first test instruction; and enabling the second development system included in the plurality of development systems to execute the second test instruction.

9. The method of claim 8, further comprising:

evaluating, by the validation computing system, the test response data generated in response to executing the first test instruction; and evaluating, by the validation computing system, the test response data generated in response to executing the second test instruction.

10. The method of claim 1, wherein enabling the first development system included in the plurality of development systems to execute the first test instruction includes enabling the first test instruction to be scheduled in a backend computing cluster; and wherein enabling the second development system included in the plurality of development systems to execute the second test instruction includes enabling the second test instruction to be scheduled in the backend computing cluster.

11. The method of claim 6, wherein outputting the test instruction includes:

outputting a plurality of test instructions, wherein each of the plurality of test instructions corresponds to a test to be performed by the development system included in the plurality of development systems.

12. The method of claim 11, wherein each of the plurality of test instructions corresponds to the test to be performed by the development system included in the plurality of development systems and is characterized as at least one of:

a data test, a performance test, a benchmark test, an explainability test, a robustness test, a causality test, a fairness test, a reliability test, or a test pertaining to a qualitative model.

13. The method of claim 11, wherein outputting the plurality of test instructions includes:

enabling each of a plurality of tests to be scheduled and executed in parallel.

14. The method of claim 13, further comprising:

enabling information to be passed between logic on a computing system that is executing each of the plurality of tests.

15. The method of claim 14, wherein enabling the information to be passed between logic on the computing system that is executing each of the plurality of tests includes:

enabling information about importance of each of the plurality of tests to be passed between logic on the computing system that is executing each of the plurality of tests.

16. The method of claim 14, wherein enabling the information to be passed between logic on the computing system that is executing each of the plurality of tests includes:

enabling information about explainability of each of the plurality of tests to be passed between logic on the computing system that is executing each of the plurality of tests.

17. A validation computing system comprising processing circuitry and a storage device, wherein the processing circuitry has access to the storage device and is configured to:

communicate with a plurality of development systems over a network;

output, over the network and to each of the plurality of development systems, a request for model telemonitoring data;

receive, over the network and from each of the plurality of development systems, responsive model telemonitoring data;

receive, from a development system included in the plurality of development systems, a request to perform a validation test on a model configured to execute on the development system included in the plurality of development systems;

output, to the development system included in the plurality of development systems and in response to receiving the request, a test instruction; and receive, from the development system included in the plurality of development systems, test response data generated in response to executing the test instruction.

* * * * *